Patented Sept. 18, 1923.

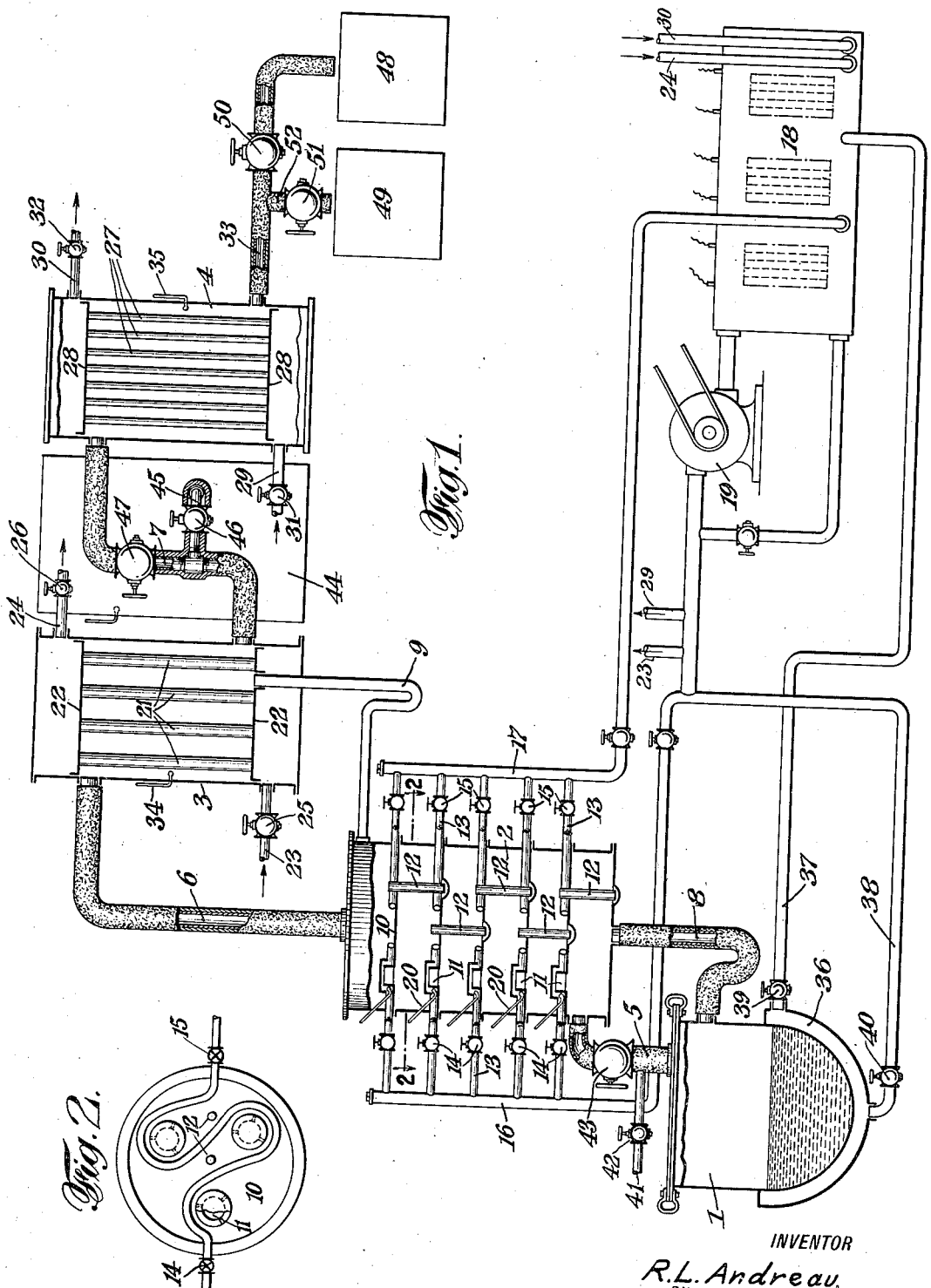

1,468,371

UNITED STATES PATENT OFFICE.

ROLAND L. ANDREAU, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF REFINING CAMPHOR.

Application filed July 17, 1920. Serial No. 396,880.

*To all whom it may concern:*

Be it known that I, ROLAND L. ANDREAU, a citizen of the United States, and a resident of Wilmington, in the county of New Castle and State of Delaware, have invented a certain new and useful Process of Refining Camphor, of which the following is a specification.

This invention relates to the purification of camphor, either synthetic or natural, and more particularly, it relates to a process of refining camphor by fractional distillation.

Heretofore, and as is well known, the best and most economical way of refining camphor, besides the old sublimation method, has consisted in distilling the camphor, with or without the addition of purifying materials, and receiving the camphor in a condensation chamber in the form of flowers; but this distillation process, as carried out at present by the various refiners presents a large number of imperfections and difficulties which seriously detract from it, as is evident from the following considerations:—

Crude camphor, natural or synthetic, contains the following impurities:—water, light terpenes distilling below but close to the boiling point of camphor, high terpenes distilling above but close to the boiling point of camphor, and terpenic acid esters decomposable by the heat during distillation, liberating high terpenes. For example, crude synthetic camphor may contain:—water, camphor M. P. 175° C., B. P. 205.5° C.; dipentene, liquid, B. P. 178° C.; foreign terpenes, liquid, B. P. 198° C.; terpenic acid ester, M. P. about 100° C. B. P. 220-240° C. (decomposed); colophene, liquid, B. P. 320° C. Thus, when impure camphor is distilled there is, since the physical natures of the volatile constituents are so similar, a considerable entrainment of one constituent with another, making it extremely difficult to separate the various terpenes in an efficient manner; the dipentenes, foreign terpenes and colophene will pass with the camphor, and the terpenic acid ester, which decomposes at 240° C., will pass along in small proportions but in sufficient amount to cause a serious contamination of the distillate, as it is yellow in color and will decompose later on when the camphor is used in plastic making. Yet, because of the difficulty of handling the camphor, due to the small difference in temperature between its melting and its boiling point and to the facility with which camphor solidifies when cooled for but a short time, the camphor refiners have refined camphor as best they could by simple distillation, using the simplest of apparatus, consisting merely of a still, a vapor pipe, and a sublimation chamber, although such a procedure could not well give those results in purity of product which have been desired. Fear has always been expressed that a less elementary procedure would be unworkable due to the "freezing up" of the system.

Now I have devised a process of distilling camphor fractionally, whereby it is entirely feasible to distill camphor fractionally like alcohol, acetone or any other liquid and wherewith I arrive at most satisfactory fractionation of the crude camphor and get a series of products, more particularly camphor, of great purity. It is the object of the invention to provide a fractional distillation process for camphor, or similar substances, which process shall have the characteristics just indicated.

According to the present invention, when distilling the crude camphor fractionally and passing the vapors through a series of liquid layers, formed by the retention of certain of the constituents, I maintain the different layers of liquid, preferably by application of heat additional to that supplied by the vapors, at a temperature sufficiently high to keep in vapor form the constituent that it is desired shall pass on, and at the same time sufficiently low to ensure that the constituents, that it is desired shall not pass on, shall be retained; in the meantime I run, by reflux, the excess from the various layers from layer to layer and finally back to the still. Preferably, I separately and individually control the temperature of each layer. Proceeding in this way, I am able to fractionate the camphor with very great accuracy, all danger of freezing being entirely eliminated, the vapor of the lower-boiling constituent e. g. camphor, that it is desired shall pass on, being freed from the entrained higher-boiling constituents, and the higher-boiling constituents being returned to the still.

Specifically, and by way of example, the distillation of crude camphor, containing water, dipentene, foreign terpenes, camphor, terpenic acid ester and colophene, may be carried on as follows, use being made of an apparatus comprising a still, reflux bubbler-plate fractionating column having a reflux pipe to the still and having provisions for heating the liquid on the plates, a dephlegmator connected with the column by a reflux pipe, and a condenser, all arranged in series: First, the water is driven off and the steam conveniently by-passed so as to not pass through the column. Next, the dipentene and foreign terpenes are taken off, the liquid on the plates being heated sufficiently to hold the vapors at about 200° C. whereby the dipentene and foreign terpenes bubble through the liquid layers of higher-boiling constituents on the plates and pass on to the dephlegmator and thus to the condenser; any entrained camphor is retained by the liquid and returns to the still by reflux. The dephlegmator is heated to hold the vapor at about 200° C. and the condenser is heated to somewhat below 178° C. Thus the dipentenes and foreign terpenes are removed without loss of camphor. Next, the camphor is taken off, the liquid on the plates being heated sufficiently to hold the vapors at a temperature, e. g., between 205.5° and 210° C., insuring the passing on of the camphor, but below the boiling point of the terpenic acid ester, so that the camphor is freed from the other constituents and, after a final refining in the dephlegmator, which is heated to a temperature to insure the passing of the camphor and retention of the higher-boiling constituents, e. g., 207° to 208° C., the camphor passes into the condenser, maintained at about 190° C., and is there condensed to a liquid, after which it may be run out and cast into blocks; or the camphor may be condensed in a chamber if preferred. The terpenic acid ester and colophene remaining behind are treated and disposed of in any desired manner.

The accompanying drawings, conventional and diagrammatic in character, illustrate an apparatus such as that suggested above. Figure 1 is substantilly an elevational sectional view, and Figure 2 is a plan view of one of the bubbler plates and its heating coil. In the illustrated apparatus, the still 1, fractionating column 2, dephlegmator 3 and condenser 4 are connected in series by the pipes 5, 6 and 7, there being a syphon reflux pipe 8 leading from the bottom of the column 2 to the top of the still 1 and a similar pipe 9 leading from the bottom of the distillate chamber of the dephlegmator to the top of the column. The column comprises the plates 10, hooded bubblers 11, and the drip or reflux pipes 12 each projecting sufficiently above the upper plate which it drains to give a liquid layer deep enough to give good bubbling action, and being liquid-sealed to the lower plate. In addition to the usual features of such column, each plate carries an oil (or steam) coil 13, the coils being individually valved at 14 and 15, into the manifolds 16 and 17 of the oil circulating system. The oil for the system is heated by the electric heater 18 and is pumped through the circuit by the pump 19. It is these heating provisions which, more particularly, fit the apparatus for use in carrying out the process. Thermometers 20 provide for noting of the temperature at each plate. The dephlegmator 3 comprises a series of pipes 21 connected to header plates 22 which divide the body of the dephlegmator into three compartments, and circulating pipes 23 and 24, valved at 25 and 26, provide for the regulated circulation through the pipes 21 of oil from the heater 18, full showing of the connections with the latter being omitted in the drawings for simplicity. The condenser 4 is similar to the dephlegmator and comprises pipes 27 connected to header plates 28, which divide the body of the dephlegmator into three compartments, and has pipes 29 and 30 with valves 31 and 32 for the regulated circulation through the pipes 27 of oil from the heater 18, complete showing of the connecting pipes being omitted to avoid confusion. The pipes 6 and 7 and the discharge pipe 33 communicate with the spaces between the headers; the temperature of the distillate being controlled by the temperature of the circulating medium, and the medium and the distillate being kept wholly separated by the headers and pipes. Thermometers 34 and 35 are preferably provided for the dephlegmator and condenser. The still 1 is heated by oil, received from the heater 18, and circulated through the jacket 36 by means of the pipes 37 and 38 having control valves 39 and 40. The pipe 41 leading from the pipe 5 and valved at 42, and the valve 43 of the pipe 5, provide for the by-passing of the steam. A condensing chamber 44, is connected with the pipe 7 by the pipe 45 valved at 46, and the pipe 7 is provided with a valve 47, so that the distillate may be diverted from the condenser 4 to the chamber 44 and condensed as flowers by the chamber method, instead of merely being converted to a liquid in the condenser 4. Receptacles 48 and 49, the one for the first distillate and the other for the camphor, are conveniently provided, the valve 50 in the pipe 33 and valve 51 in the branch pipe 52 providing for properly directing the distillate. Such insulation more particularly for the pipes 5, 6, 7, 45, 33, 8, and 52, as is desired may be provided. The operation will be evident.

For the sake of brevity and clearness I refer to the heating of the layers sufficiently high to keep in vapor form the constituent that it is desired shall pass on, to the insuring of the non-condensation of the camphor, and so forth; but, as will be understood by those familiar with the art of fractional distillation, a certain proportion of the said constituent, e. g. camphor, is temporarily condensed during the fractionating, but, as the distilling proceeds is revaporized and passes on.

Although, in describing the present process, I have made reference to the illustrated apparatus wherein circulation pipes are provided for maintaining in liquid form the constituents upon the plates, it is to be understood that I do not restrict the process to maintaining the liquid form by the aid of circulation pipes, for other means, serving the general purpose of keeping in liquid form the constituents collecting on the plates, may be incorporated in the particular apparatus used without departure from my invention.

I claim:

1. The process of refining crude camphor, including two constituents of different boiling points, which comprises heating the camphor to vaporize the constituent of lower boiling point, collecting the entrained constituent of higher boiling point in a series of liquid layers, passing the vapor through said layers and at the same time supplying heat to said layers in addition to that supplied by said vapor and in amount sufficient to insure the non-condensation of said vapor but insufficient to vaporize the constituent of higher boiling point, returning the excess liquid from said layers to the body of impure camphor, and condensing the vapor of the constituent of lower boiling point.

2. The process of refining crude camphor comprising camphor and a constituent of higher boiling point, which comprises heating the crude camphor to vaporize the pure camphor, collecting the entrained constituent of higher boiling point in a series of liquid layers, passing the camphor vapor through said layers and at the same time supplying heat to said layers in an amount sufficient to maintain the temperature of said vapor at at least 205.5° C., but insufficient to vaporize the constituent of higher boiling point, returning the excess liquid from said layers to the body of impure camphor, and condensing the camphor vapor.

3. The process of refining crude camphor comprising camphor and terpenic acid ester, which comprises heating the crude camphor to vaporize the pure camphor, collecting the entrained terpenic acid ester in a series of liquid layers, passing the camphor vapor through said layers and at the same time supplying heat to said layers to give them a temperature sufficient to heat the vapor to 205.5° C. or above, but below 220° C., returning the excess liquid from said layers to the body of impure camphor, and condensing the camphor vapor.

4. The process of refining crude camphor which comprises heating the crude camphor to vaporize the pure camphor, passing the vapor through a reflux fractionating column while heating the liquid layers in the column sufficiently to insure the passage of the camphor vapor but insufficiently to vaporize the impurities of higher boiling point than the camphor, returning excess liquid from said layers to the body of impure camphor by reflux, and condensing the camphor vapor.

5. The process of refining crude camphor which comprises heating the crude camphor to vaporize the pure camphor, passing the vapor through a reflux fractionating column while heating the liquid layers in the column sufficiently to insure the passage of the camphor vapor but insufficiently to vaporize the impurities of higher boiling point than the camphor, returning excess liquid from said layers to the body of impure camphor by reflux, passing the vapor from the column through a dephlegmator, while heating the dephlegmator sufficiently to insure the passage of the camphor vapor but insufficiently to hold in vapor phase the impurities of higher boiling point than the camphor, returning the liquid from said dephlegmator to the column, and condensing the camphor vapor.

6. The process of refining crude camphor which comprises heating the crude camphor and removing the impurities having boiling points below the boiling point of camphor, vaporizing the pure camphor, passing the vapors through a reflux fractionating column while heating the liquid layers in the column sufficiently to insure the passage of the camphor vapor but insufficiently to hold in vapor phase the impurities of higher boiling point than the camphor, returning excess liquid from said layers to the body of impure camphor by reflux, and condensing the camphor vapor.

7. In the refining of camphor, the steps which comprise vaporizing impure camphor and passing the resulting vapors through a series of individually distinct layers consisting of camphor and camphor impurities while individually heating said layers to maintain them in liquid form, passing the camphor impurities and some of the camphor from layer to layer by reflux, and condensing the camphor vapor that passes through said layers uncondensed.

8. In the refining of camphor, the steps which comprise vaporizing impure camphor and passing the resulting vapors through a plurality of layers of liquid consisting of camphor and camphor impurities, while maintaining said layers at a temperature which will permit a portion of camphor vapor to pass therethrough uncondensed, but which will cause condensation of substantially all of the camphor impurities.

9. In the refining of camphor, the steps which comprise vaporizing impure camphor and subjecting the resulting vapors to a reflux action in a fractionating column.

10. In the refining of camphor, the steps which comprise vaporizing impure camphor and passing the resulting vapors through layers consisting of camphor and camphor impurities while maintaining said layers in liquid form, passing the camphor impurities and some of the camphor from layer to layer by reflux, and condensing the camphor vapor that passes through said layers uncondensed.

In testimony whereof I affix my signature.

ROLAND L. ANDREAU.